US008055271B2

(12) United States Patent  
Nair et al.

(10) Patent No.: US 8,055,271 B2  
(45) Date of Patent: Nov. 8, 2011

(54) INTELLIGENT LOCATION-TO-CELL MAPPING USING ANNOTATED MEDIA

(75) Inventors: Rahul Nair, Oakland, CA (US); Mor Naaman, San Francisco, CA (US); Shane P. Ahern, Foster City, CA (US); Simon P. King, Berkeley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 594 days.

(21) Appl. No.: 11/671,355

(22) Filed: Feb. 5, 2007

(65) Prior Publication Data

US 2008/0189028 A1 Aug. 7, 2008

(51) Int. Cl.
 *H04W 24/00* (2009.01)
 *H04M 3/00* (2006.01)
 *G06F 15/16* (2006.01)
(52) U.S. Cl. .................. 455/456.1; 455/418; 455/456.6; 709/217
(58) Field of Classification Search ............... 455/456.1, 455/418, 456.6; 709/217
 See application file for complete search history.

(56) References Cited

U.S. PATENT DOCUMENTS

| | | | |
|---|---|---|---|
| 7,028,253 B1 * | 4/2006 | Lieberman et al. ........... | 715/232 |
| 7,702,681 B2 * | 4/2010 | Brewer et al. ................. | 707/748 |
| 2003/0148771 A1 * | 8/2003 | de Verteuil ..................... | 455/456 |
| 2005/0192999 A1 * | 9/2005 | Cook et al. ..................... | 707/102 |
| 2006/0095540 A1 * | 5/2006 | Anderson et al. ............. | 709/217 |
| 2007/0032244 A1 * | 2/2007 | Counts et al. .............. | 455/456.1 |
| 2007/0032945 A1 * | 2/2007 | Kaufman ...................... | 701/208 |
| 2007/0136493 A1 * | 6/2007 | Linner .......................... | 709/248 |
| 2007/0232323 A1 * | 10/2007 | Spriestersbach ........... | 455/456.1 |
| 2008/0064438 A1 * | 3/2008 | Calvet et al. ............... | 455/556.1 |
| 2008/0085725 A1 * | 4/2008 | Grayson et al. ............ | 455/456.1 |

OTHER PUBLICATIONS

Yahoo Company, del.icio.us / help / tags, downloaded Jul. 17, 2006, http://del.icio.us/help.tags.
Yahoo Company, flickr, Yahoo Company, downloaded Jul. 17, 2006, http://flickr.com/help/tags#37.
Yahoo Company, del.icio.us / help / bundles, downloaded Jul. 17, 2006, http://del.icio.us/help/bundles.
Yahoo Company, del.icio.us / help / for, downloaded Jul. 17, 2006, http://del.icio.us/help/for.
Sarvis and Herrate et al., Metadata Creation System for Mobile Images, *MobiSys* '04, Jun. 6-9, 2004, Boston, MA, 2004; pp. 36-48.
Naaman et al., From Where to What: Metadata Sharing for Digital Photographs with Geographic Coordinates, Stanford University Visitor Center, 2005, pp. 1-21.
U.S. Appl. No. 11/672,901, filed Feb. 8, 2007.

* cited by examiner

*Primary Examiner* — Marivelisse Santiago Cordero
*Assistant Examiner* — Mong-Thuy Tran
(74) *Attorney, Agent, or Firm* — Weaver Austin Villeneuve & Sampson LLP (57) ABSTRACT

Disclosed are apparatus and methods for providing location information for a current location of a portable device, such as a camera-phone. In general, a current, generic location, e.g., cell ID, of the portable device is mapped to a more specific location description, e.g., the name of a specific city, that is defined by one or more users. In a specific implementation, one or more users of portable devices may be encouraged to contribute specific location descriptions with respect to media objects or the like that are managed on their portable devices. When a particular user ties a specific location to a media object or the like, the media object serves to also tie the particular user's current generic location or cell ID to the media object. Thus, a plurality of media objects and their associated specific and generic location descriptions can be analyzed to determine a most relevant specific location description for a particular generic location or cell ID. The specific location that is tied to a generic location may be used in any number of applications, such as automatically associating such specific location with any media objects that are captured in the corresponding generic location, e.g., cell ID.

27 Claims, 6 Drawing Sheets

INTELLIGENT LOCATION-TO-CELL MAPPING USING ANNOTATED MEDIA

BACKGROUND OF THE INVENTION

The field of the present invention relates generally to providing location information for a portable device application, such as a camera-phone application.

The proliferation and use of web- or email-enabled camera-phones has rapidly increased in recent years. Additionally, an increasing number of applications that utilize the web and/or camera feature of the camera-phone are being implemented and used by consumers. By way of example, the ZoneTag application by Yahoo! Inc. of Sunnyvale, Calif. allows a user to tag his/her photos that are captured by the camera-phone and then upload the tagged photos to a photo sharing or organization application such as Flickr, which is also available from Yahoo! Inc.

In some cases, it would be beneficial to associate a location with such media objects, for example, that are captured with camera-phones. For instance, one may wish to organize photos by the locations in which the photos were captured. Although camera-phones are continuously updated with a cellular tower identity (cell ID), a cell ID does not provide an adequate location description that is useful or meaningful to the user for organizational or sharing purposes. Additionally, although a user can tag a photo with a location identity, this manual tagging process can be burdensome to users and, accordingly, users are often discouraged from providing location tagging for their photos.

In sum, it would be beneficial to provide location information for a portable device application, such as a camera-phone application, that corresponds to a current position, such as cell ID, of the portable device.

SUMMARY OF THE INVENTION

Accordingly, apparatus and methods for providing location information for a current location of a portable device, such as a camera-phone, are disclosed. In general, a current, generic location, e.g., cell ID, of the portable device is mapped to a more specific location description, e.g., the name of a specific city, that is defined by one or more users. In a specific implementation, one or more users of portable devices may be encouraged to contribute specific location descriptions with respect to media objects or the like that are managed on their portable devices. When a particular user ties a specific location to a media object or the like, the media object serves to also tie the particular user's current generic location or cell ID to the media object. Thus, a plurality of media objects and their associated specific and generic location descriptions can be analyzed to determine a most relevant specific location description for a particular generic location or cell ID. The specific location that is tied to a generic location may be used in any number of applications, such as automatically associating such specific location with any media objects that are captured in the corresponding generic location, e.g., cell ID.

In one embodiment, a method for mapping a specific location to a particular generic location of a mobile device is disclosed. A generic location for a particular user of a mobile device is provided. A specific location is then determined, based on analysis of one or more locations entered by one or more users for such same generic location, and this specific location is mapped to the generic location. The analysis to determine the specific location is personalized with respect to the particular user.

In a specific implementation, the generic location is a cellular tower identity (ID). In one embodiment, the analysis of the user-entered location(s) is prioritized in the following order: (i) one or more locations entered by the particular user for the same generic location, (ii) one or more locations entered by the particular user's social network for the same generic location, and (iii) one or more locations entered by the general public for the same generic location. In a further aspect, the analysis of the user-entered location(s) is further based on location data for the same generic location that is obtained from an external source. In yet another aspect, the external source is a global positioning satellite (GPS) system. In a further feature, the generic location is in the form of a cellular tower ID and the external source is a cellular phone provider service that provides location data that is mapped to cellular tower ID's.

In a specific embodiment, the analysis includes performing (a) text analysis on at least one user-entered location to translate it from a free form string into one or more proper nouns, which together identify a specific location, and/or (b) collision control so as to select the specific location, which is most likely to be accurate, from a plurality of specific locations that conflict with each other. In a further aspect, collision control includes selecting the majority user-entered location as the specific location for mapping to the generic location. In yet a further aspect, the analysis further includes downgrading the selected user-entered location to a less specific location based on the other user-entered locations.

In another embodiment, the one or more locations entered by one or more users for the generic location include a location that was entered by a user for a media object captured on a camera-phone device, wherein such location and the generic location, which is in the form of a cell ID, are associated with the media object. In yet another embodiment, the generic location is the particular user's triangulation cellular position with respect to a plurality cellular towers or is the one or more cellular loops that the particular user is experiencing with respect to a plurality of cellular towers. In another aspect, one or more points are presented to a user each time the user enters a location for a particular generic location so as to motivate users to enter locations.

In another embodiment, the invention pertains to an apparatus an apparatus having a processor and a memory that is configured to perform one or more of the above described operations. In another embodiment, the invention pertains to at least one computer readable storage medium having computer program instructions stored thereon that are arranged to perform one or more of the above described operations.

These and other features will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general, a cell ID or the like is associated with (or mapped to) a specific location description for a particular user based on analysis of the locations that one or more users, including the particular user, have entered for the same cell ID (or a neighboring cell ID). The analysis of the user-entered locations is personalized for the particular user. In one implementation, the mapping of location to cell ID is prioritized based on the following order: (i) one or more locations entered by the particular user, (ii) one or more locations entered by the particular user's social network, and (iii) one or more locations entered by the general public. Location data from external sources, such as GPS and cellular service networks, may also be considered for mapping to a particular cell ID as a last option. In sum, cell ID and location mapping for a particular user is based on the particular user's social networks or personalized location assignments. That is, cell ID is translated to a location in a personalized manner.

Cell ID to location mapping may be utilized in a wide variety of applications. One example is a media organization application, which is used to organize and share photos or other media objects. Organization and sharing of media objects can be performed based on location. Examples of other applications that are utilized in a portable device, in which it would be beneficial to utilize location data, include local-search applications and location-sharing and disclosure systems.

Although the following embodiments are described in relation to cell ID mapping to a specific location, other types of generic locations, besides cell ID, may be mapped to a specific location. Other examples of a generic location may include a particular user's triangulation position with respect to a plurality of cell ID's or a particular user's loops that he/she is experiencing with respect to a plurality of cell ID's. One form of location information is a media annotation or tag, which may take any form, such as a text character or string, one or more symbols, or one or more icons. Although the following description is directed specifically to analyzing the annotation or tags of media type objects, such as photos, video, and audio files, to then provide location information, it is noted that annotations can be analyzed from other types of objects, such as executable files, text documents, web pages, etc. Also, a user may simply be requested to enter a location for a particular cell ID (or the like). A user who provides or uses location information may be an automated entity or an actual person.

Figure 1:
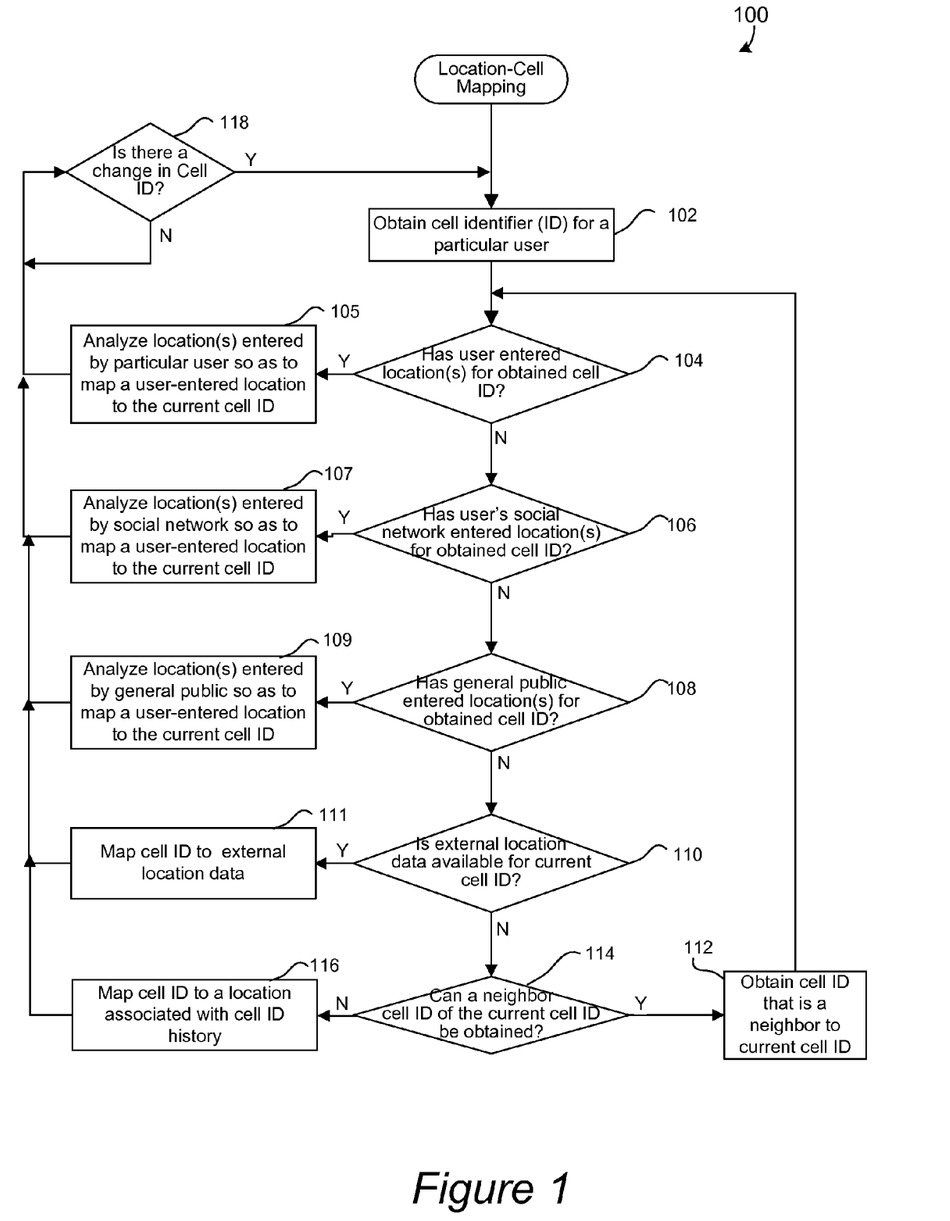
FIG. 1 is a flow chart illustrating a procedure for location-to-cell ID mapping in accordance with one embodiment of the present invention.

FIG. 1 is a flow chart illustrating a procedure 100 for location-to-cell ID mapping in accordance with one embodiment of the present invention. Initially, a cell ID is obtained for a particular user in operation 102. A particular's user's cell ID may be obtained for mapping purposes in any suitable manner. For instance, each time a particular user of a camera-phone moves to a new cell ID, the new cell ID is obtained for mapping processing. The new cell ID may be obtained and mapped to a location by an application on the camera-phone (or the like) or obtained and mapped by an application on another device. In another example, a cell ID is obtained when a media object that is associated with a cell ID is uploaded to a server (e.g., from a camera-phone). A particular user's current cell ID may be obtained by the camera-phone sending the current cell ID from the camera-phone to a server application or by such server application polling the camera-phone for the current cell ID.

Figure 2:
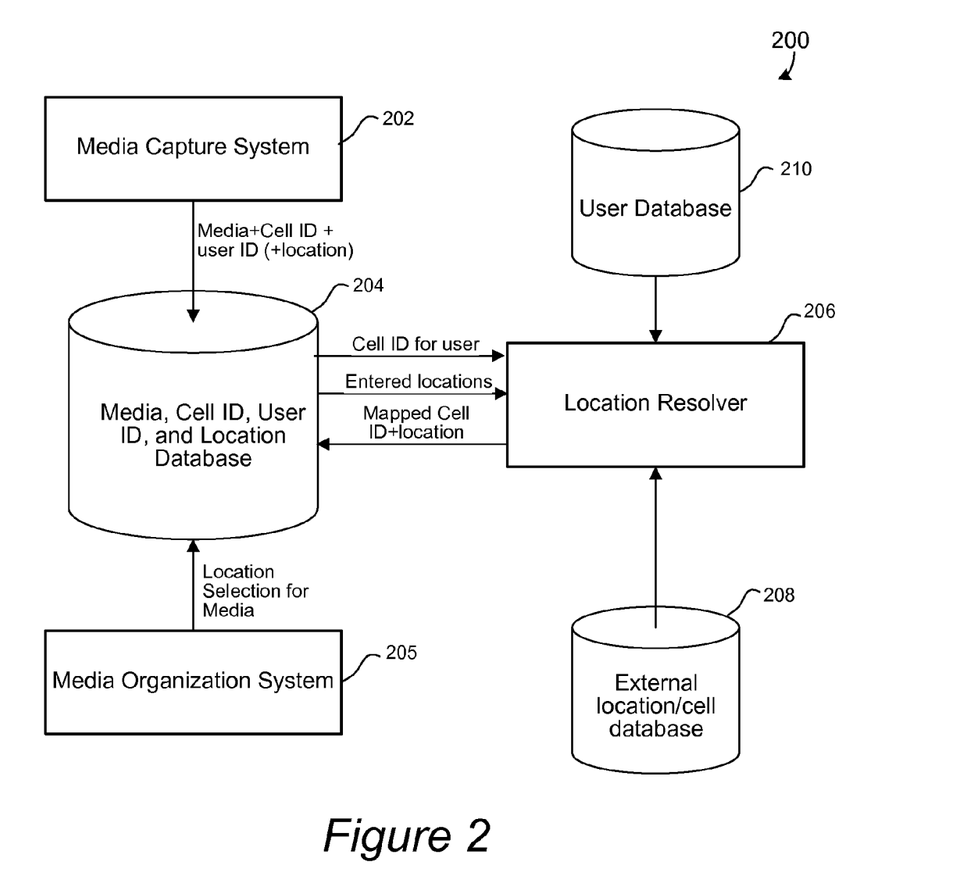
FIG. 2 is a diagrammatic representation of a system in which techniques of the present invention may be implemented.

FIG. 2 is a diagrammatic representation of a system 200 in which techniques of the present invention may be implemented. As shown, the system 200 includes a media capture system 202 for capturing a media object, such as a photo or video. Such media capture system 202 may be implemented on a web- or email-enabled camera-phone. As the particular user moves his/her camera-phone, the camera-phone may be updated with the closest cell ID, which may be stored for a particular time period. Thus, when a media object is captured, the new media object may be associated (e.g., tagged) with the most current cell ID.

The captured media and associated cell ID may then be sent to a Media, Cell ID, User ID, and Location database 204. Relationship information between specific media, cell ID's, user ID's, and location may be stored in any suitable number of databases, which may be located at the same or different sites. In this example, a location resolver 206 obtains a current cell ID for a particular user, (e.g., for a particular user ID) from the Media, Cell ID, User ID, and Location database 204. For instance, when a new media object associated with a cell ID and user ID is uploaded to Media, Cell ID, User ID, and Location database 204, the associated cell ID may be mapped to a location by the location resolver as explained further below.

A media object may also be associated with other cell ID's that were stored for the particular time period so as to provide a cell ID history with the media object, along with the most current cell ID. The time period is selected so that the cell ID history is likely to apply to the last captured media object. For example, 5 minutes works well.

After a cell ID is obtained for a particular user, it may then be determined whether the particular user has entered one or more locations for the obtained cell ID in operation 104. If the particular user has entered one or more locations, the location(s) entered by the particular user may be analyzed so as to map a user-entered location to the current cell ID in operation 105. Otherwise, it may be determined whether the user's social network has entered one or more locations for the obtained cell ID in operation 106. If one or more social network members have entered one or more locations, the location(s) entered by the particular user's social network are analyzed so as to map a social network-entered location to the current cell ID in operation 104. If the user's social network has not entered one or more locations for the particular cell ID, it may be determined whether the general public had entered one or more locations for the obtained cell ID in operation 108. If the general public has entered one or more locations, the location(s) of the public-entered location(s) are analyzed so as to map a public-entered location to the current cell ID in operation 109.

User-entered locations may be obtained and analyzed in any suitable manner. In general, locations which are associated with the current cell ID of the particular user are analyzed to select a location for mapping to the current cell ID. A user may associate a location with a particular cell ID in any number of circumstances. When a media object is captured on his/her camera-phone, the user may then associate the media object with a location via a user interface on the camera-phone. The new media object is also automatically associated with the most recent cell ID. In another example, a photo may be dragged by a user to a map to then associate a specific map location with such photo. A user may simply select a point on a map to associate with one or more media objects. In other examples, a user may associate a location with a media object by associating an audio location with the media object. In this example, voice recognition may be utilized to determine the location. Regardless of the specific association technique used, the new media object provides an association between a cell ID and a user-entered location.

The locations which are also associated with the particular user's user ID may be obtained and analyzed first. Locations that are associated with a user ID that belongs to the particular user's social network may be obtained and analyzed next. A user database, e.g., 210 of FIG. 2, may include data structures that specify user ID's that belong to each particular user' social network. The media, cell ID, user ID, location, and user databases 204 and 210 may be in the form of one or more databases that are located internal or external to the media organization system 205. Locations that are associated with a user ID of the general public (not the particular user or members of such user's social network) may be obtained and analyzed last.

Figure 4A:
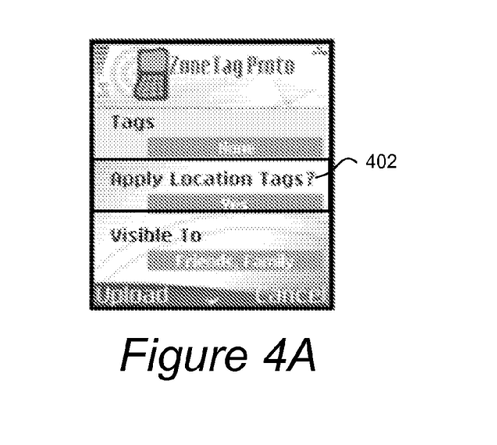
FIG. 4A illustrates a screen shot of a user interface for selecting a location entry option on a camera-phone in accordance with a specific implementation of the present invention.

FIG. 4A illustrates a screenshot of a user interface 400 for selecting a location entry option 402 on a camera-phone in accordance with a specific implementation of the present invention. This location entry option may be applied to one or more selected media objects. In one embodiment, this user interface 400 is presented to the user after capturing a particular media object and is applicable to the newly captured media object. In other embodiments, the user may select a list of captured media objects and then select a media option via hard or soft buttons of the camera-phone.

Figure 4B:
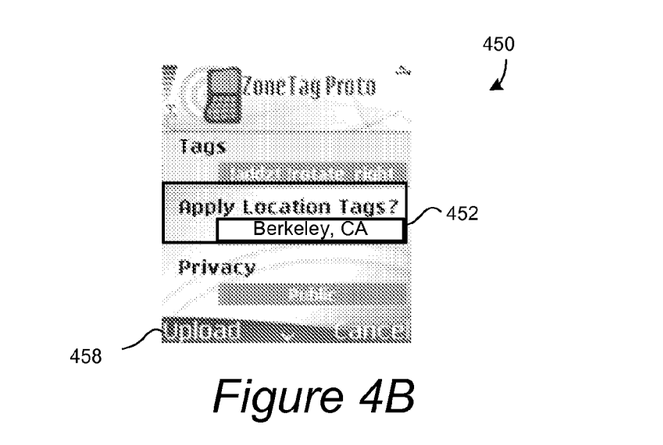
FIG. 4B is a screen shot of a mechanism for entering a location on a camera-phone in accordance with one embodiment.

When the user selects the location entry option 402, a mechanisms for entering a location may be presented to the user, as shown in the screen shot of user interface 450 of FIG. 4B. As illustrated, the user has entered "Berkeley, Calif." into an input box 452. The location "Berkeley, Calif." may then be automatically associated with the newly captured media object. By selecting an upload option 458, the user may then upload the media object and its associated location, user ID, and cell ID to a database of media organization system, for example.

Figure 4C:
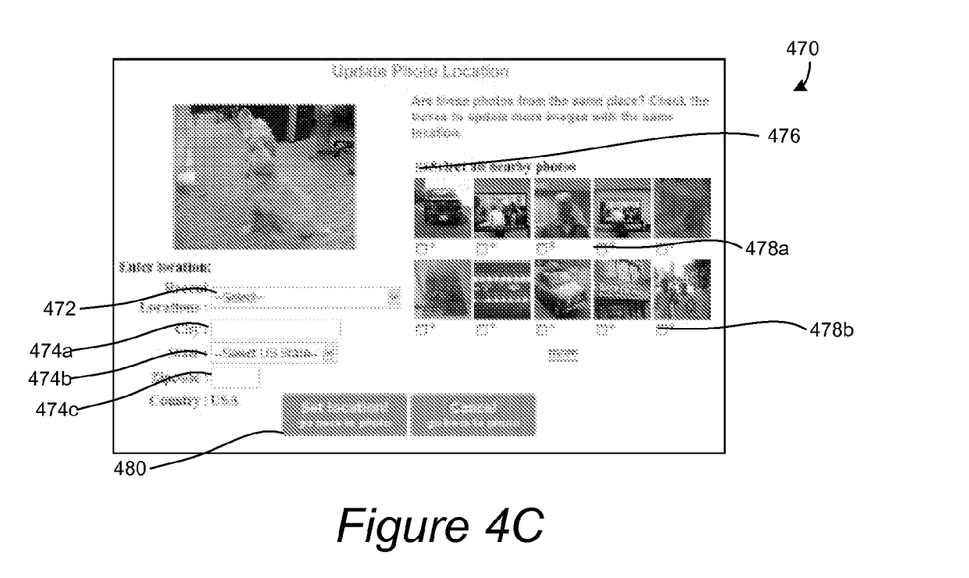
FIG. 4C is a screen shot of a mechanism for entering a location in a media organization system in accordance with one embodiment.

A user may also enter a location for a media object that has been uploaded to another application, such as the Media, Cell ID, User ID, and Location database 204 of media organization system 205. The media organization system 205 may provide a user interface to associate a location with a media object that was already associated with a cell ID. FIG. 4C is a screen shot of a mechanism 470 for entering a location in a media organization system in accordance with one embodiment. Such a user interface 470 may be presented to a user for one or more photos that have a same cell ID (or share neighboring cell ID's). As shown, a user may select a predefined or recently selected location via a pull-down menu 472. Alternatively, a user may enter one or more of the following fields: city 474a, state 474b, and/or zipcode 474c. An entered or selected location may be applied to one or more photos or videos. For instance, a user may apply the entered location to all of a set of nearby photos by selecting checkbox 476 or apply the entered location to one or more individual photos by selecting individual checkboxes associated with individual photos, e.g., 478a and 478b. Once a location is entered and one or more nearby photos are selected, the user may set the location and photo associations by selecting soft button 480.

In sum, location may be entered by a user from media capture system 202 and/or media organization system 205 so that such location is associated with one or more media objects of Media, Cell ID, User ID, and Location database 204. A user may also simply enter a location for a particular cell ID irrespective of a particular media object. For instance, a user of a camera-phone or any cellular phone may be periodically polled to provide a location. When the user provides a location, the provided location is then associated with the user's current cell ID. Location and cell ID mappings may be stored in one or more databases (not shown) that are accessible by location resolver 206.

Referring back to FIG. 1, if the general public has not entered a location, it then may be determined whether an external location data source is available for the current cell ID in operation 110. An external location data source may take any suitable form, such as a GPS (global positioning satellite) location that is sensed by a GPS device in the user's device or camera-phone or that is sensed by a GPS device that is separate from the user device that is obtaining a current cell ID. In the later example, the user device for obtaining cell ID may obtain the sensed GPS location data via any manner, such as a wireless communication protocol like Bluetooth that is documented by the Bluetooth Special Interest Group (SIG) of Bellevue, Wash. Another source of location data may be a location database which associates specific locations with specific cell ID's, available from a cellular provider.

If external location data is available, the cell ID may be mapped to the external location data in operation 111. Otherwise, it may be determined whether a neighbor cell ID of the currently cell ID can be obtained in operation 114. If a neighbor cell ID can be obtained, then a cell ID that is a neighbor of the currently obtained cell ID may be obtained in operation 112 and the procedure is repeated for the neighbor cell ID. The current cell ID's neighbor cell ID may be obtained from a preconfigured list of neighboring cell ID's available from an accessible database or determined by analyzing cell ID's obtained in about a same time period. For instance, neighboring cell ID's typically belong to a same number series.

If a neighbor cell ID is not present or a neighbor cell ID is not determinable, the current cell ID may be mapped to a location that is associated with the cell ID history in operation 116. For instance, if a cell ID in the history has an associated location, this location can be mapped to the current cell ID. If there are multiple locations mapped to the cell ID history, any of the locations may be selected for mapping based on any suitable criteria. For example, the most recent cell ID's location may be used for mapping to the current cell ID. The location information from the cell ID history may also be degraded (e.g., a zipcode or a combination zipcode and city is downgraded to a city location only), but degradation is not necessary.

After the current cell ID is mapped to a location (e.g., in operations 105, 107, 109, 111, or 116), it may then be determined whether there has been a change in the current cell ID in operation 118. When the current cell ID changes, the procedure 100 may be repeated for the new current cell ID for the particular user. Of course, the cell ID-to-location mapping procedure 100 may be triggered in any suitable manner, besides the user switching to a new cell ID, as described above.

Figure 3:
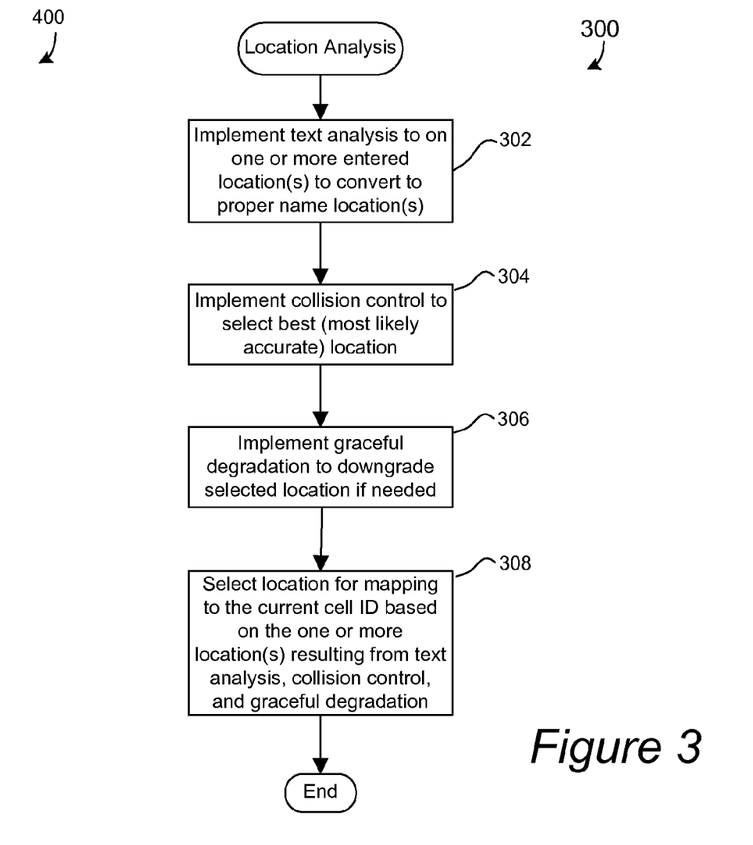
FIG. 3 is a flow chart illustrating a location analysis procedure in accordance with a specific implementation of the present invention.

A set of entered locations that were entered for a particular cell ID (e.g., for a particular user, social network, or the general public) may be analyzed in any number of ways in order to determine which location to map to a particular cell ID. FIG. 3 is a flow chart illustrating a location analysis procedure 300 in accordance with a specific implementation of the present invention. Some sort of text analysis may be initially implemented on one or more of the entered location(s) to covert them to proper name location(s) in operation 302. For instance, the text of an entered location is parsed to find the proper name components of a location, such as a city, state, country, and zipcode. Single components, such as a city, may also be converted to a multiple component location. For instance, the location "San Francisco" may be converted to "San Francisco, Calif.". Location components that are ambiguous and may belong to multiple locations may be resolved based on other location information associated with a particular cell ID. For instance, if a cell ID is associated with several California locations, a location referring to "Dublin" for the same cell ID may be interpreted as referencing Dublin, Calif., rather than Dublin, Ga. or Dublin, Ireland. In sum, a free format location may be converted into a specific proper name type location based on analysis of locations associated with the same cell ID or neighboring cell ID's.

Collision control may also be implemented to select the best or most likely accurate location from the analyzed location entries in operation 304. Collision control generally includes assessing which location entry is more accurate from among a plurality of locations that include at least some conflicting locations. In one implementation, the majority location is selected as the most accurate location. In further implementations, external location data may be utilized to determine which location is the most accurate. For instance, location associated with neighboring cell ID's may be utilized to determine which location for a particular cell ID is most likely accurate. In a specific example, if 3 locations refer to Albany, Calif. and 2 locations refer to Berkeley, Calif. for a single cell ID and three neighbor cell ID's have all been mapped to Albany, Calif., then it may be determined that the Albany, Calif. location is most likely accurate for the single cell ID that is under assessment. Other types of external location data that may be used for collision control include a sensed GPS location and location-to-cell mapping available from a cellular service provider or the like.

Graceful degradation may also be implemented to downgrade selected locations when needed in operation 306. Graceful degradation may include assessing neighboring cell ID locations to determine that a specific location reference needs to be downgraded to a less specific location reference due to determining that the more specific reference may be inaccurate. For instance, a user may enter a location Berkley, Calif. 94708 for a particular cell ID and if all of the neighboring towers are mapped to a different zipcode, the location entry for the particular cell ID may be downgraded to Berkeley, Calif. so as not to include the zipcode.

A location for mapping to the current cell ID may then be selected for the particular cell ID based on the one or more locations that result from the text analysis, collision control, and graceful degradation in operation 308. In one implementation, text analysis is performed on the one or more location entries for a current cell ID to generate one or more proper name locations. If there is a plurality of proper name locations, then collision control is performed to select a location that is most likely accurate. Graceful degradation may then be performed on this selected location if appropriate.

The selected location may be mapped to the current cell ID by forming an association between the selected location and the current cell ID in one or more database(s), such as Media, Cell ID, User ID, and Location Database 204 of FIG. 2. This location-to-cell mapping may be updated for all media objects or for media objects that do not have a location association yet.

System embodiments of the present invention can allow ties between cell tower positioning and camera phone based personal photo collections. The location information facilitates sharing, tagging, and organization of media objects based on location information. The ease of sharing, tagging, and organizing media objects based on location can be seen as incentives that can bring users to contribute location information about cell tower locations, even when unaware of the beneficial side effects of their actions. As many users understand the benefits of location-based information for searching and browsing images, they will likely more frequently add location information to their photos.

Figure 4D:
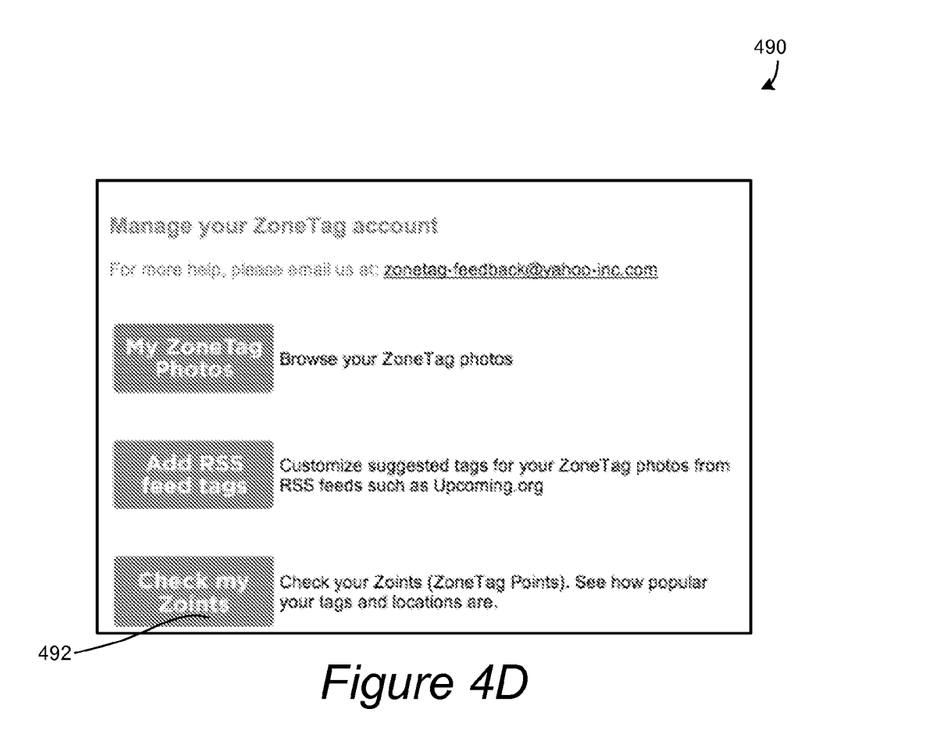
FIG. 4D is a screen shot of a user interface that allows a user to select an option to view their Zoints that have been accrued for location entries in accordance with one embodiment of the present invention.

Mechanisms may be included in the location mapping systems described above to further motivate users to associate location information with cell ID or media objects. In one implementation, each user receives "Zoints" that represent points each time the user enters a location for a particular cell ID. The user may receive Zoints under any number of circumstances. The user may receive Zoints for simply responding to a request (e.g., beep) on their camera-phone to enter a location for the current cell ID at which the user is located. The user may receive Zoints for entering a location to a particular media object via a media tagging application (e.g., ZoneTag) on their device that captured the object or via a media organization and/or sharing application (e.g., Flickr) on a device to which the media objects are uploaded. The user may then receive rewards for different levels of Zoints that are reached to further encourage location entry. FIG. 4D is a screen shot of a user interface 490 that allows a user to select an option 492 to view their Zoints that have been accrued for location entries in accordance with one embodiment of the present invention.

Embodiments of the present invention for analyzing location in a prioritized scheme makes the system robust in the face of various issues that arise in this domain. First, user-contributed data is prone to mistakes as well as malicious spam. Trusting the user and the user's social network data first can potentially filter some of these issues. Second, cell tower coverage is "fuzzy". For example, coverage from Tower A can overlap with other towers and can also transcend zip code or city boundaries. On the one hand, this fuzziness means the system can never be perfect: two users can take two photos in two different cities while their camera-phones are connected to the same cell tower. If cell tower location alone is used, one of the photos is guaranteed to be associated with wrong location data. However, the personal-social approach can provide more accurate results, by prioritizing locations that individual users, and their contacts, have frequented in the past. Enhancements that incorporate cell triangulation or loops could provide improved accuracy, as well as more advanced models of data verification and trust.

Embodiments of the above described system leverage the actions of this motivated subset of users for the benefit of all users in the system. In embodiments of the present invention, the system uses social information tied to individual users and photos to manage known problems with user-contributed data, such as labeling mistakes and spam, as well as to handle issues that arise from the "fuzziness" of cell signal propagation and coverage (e.g., cell overlap).

Figure 5:
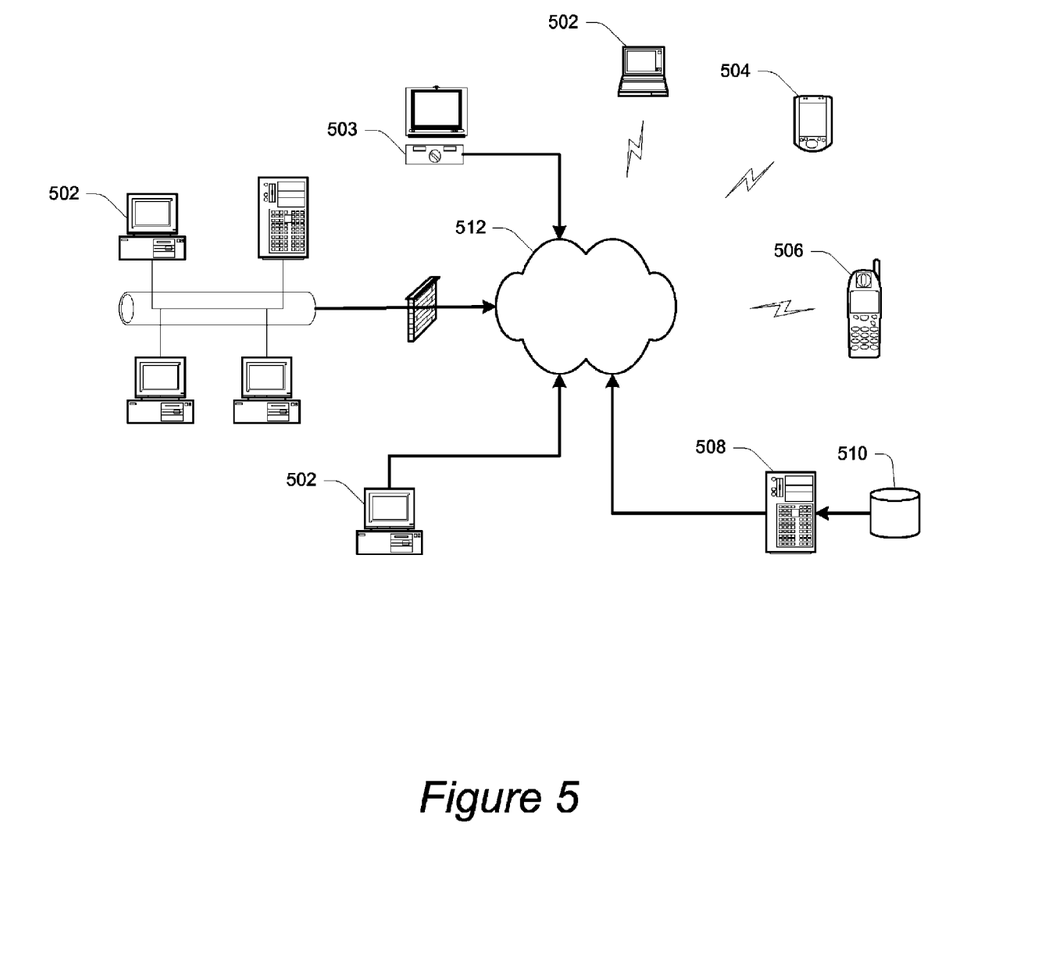
FIG. 5 is a simplified diagram of a network environment in which specific embodiments of the present invention may be implemented.

Embodiments of the present invention may be employed for location mapping in any of a wide variety of computing contexts. For example, as illustrated in FIG. 5, implementations are contemplated in which the relevant population of users interact with a diverse network environment via any type of computer (e.g., desktop, laptop, tablet, etc.) 502, media computing platforms 503 (e.g., cable and satellite set top boxes and digital video recorders), handheld computing devices (e.g., PDAs) 504, cell phones 506, or any other type of computing or communication platform.

And according to various embodiments, objects and their associated location information that are processed in accordance with the invention may be obtained using a wide variety of techniques. For example, location associations representing a user's interaction with a local application, web site or web-based application or service (e.g., associations between objects and their location tags and their parameters) may be accomplished using any of a variety of well known mechanisms for recording a user's behavior. However, it should be understood that such methods of tagging are merely exemplary and that tagging information may be collected in many other ways. For example, tagging information for various objects may be collected when a user uploads objects or registers with, for example, a particular web site or service.

Once one or more location tags are associated with one or more objects, tagged media objects may be handled according to the invention in some centralized manner. Additionally, associations between cell ID and location information irrespective of media objects may be handled in the some centralized manner. A centralized system is represented in FIG. 5 by server 508 and data store 510 that, as will be understood, may correspond to multiple distributed devices and data stores. The invention may also be practiced in a wide variety of network environments (represented by network 512) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Figure 6:
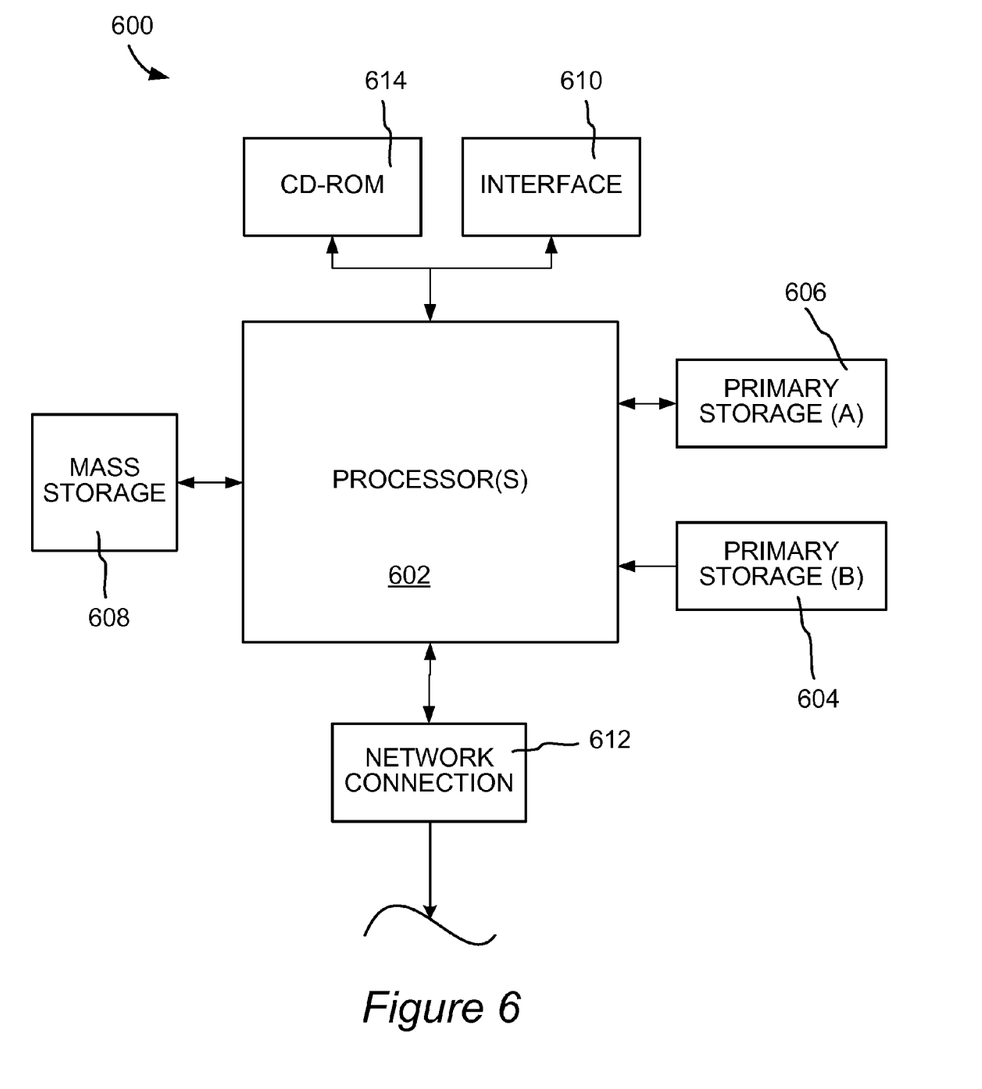
FIG. 6 illustrates a typical computer system that, when appropriately configured or designed, can serve as a location mapping system (or location resolver) of this invention.

FIG. 6 illustrates a typical computer system that, when appropriately configured or designed, can serve as a location mapping system (or location resolver) of this invention. The computer system 600 includes any number of processors 602 (also referred to as central processing units, or CPUs) that are coupled to storage devices including primary storage 606 (typically a random access memory, or RAM), primary storage 604 (typically a read only memory, or ROM). CPU 602 may be of various types including microcontrollers and microprocessors such as programmable devices (e.g., CPLDs and FPGAs) and unprogrammable devices such as gate array ASICs or general purpose microprocessors. As is well known in the art, primary storage 604 acts to transfer data and instructions uni-directionally to the CPU and primary storage 606 is used typically to transfer data and instructions in a bi-directional manner. Both of these primary storage devices may include any suitable computer-readable media such as those described herein. A mass storage device 608 is also coupled bi-directionally to CPU 602 and provides additional data storage capacity and may include any of the computer-readable media described above. Mass storage device 608 may be used to store programs, data and the like and is typically a secondary storage medium such as a hard disk. It will be appreciated that the information retained within the mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 is also coupled to an interface 610 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to an external device such as a database or a computer or telecommunications network using an external connection as shown generally at 612. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store the media objects, associations between media objects and location, cell ID, and other types of tags, associations between location and cell ID's, information identifying neighboring cell ID's, external location information, Zoints for specific users, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as air, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Although the above examples describe a user associating location tags with his/her own media objects, of course, a user may also associate a location tag with another user's media objects or with media objects that were automatically generated without a user. Therefore, the present embodiments are to be considered as illustrative and not restrictive and the invention is not to be limited to the details given herein, but may be modified within the scope and equivalents of the appended claims.

What is claimed is:

1. A method for mapping a specific location to a generic location of a mobile device, comprising:
   for a generic location, obtaining a plurality of specific locations that were entered by a plurality of users to annotate a plurality of media objects on their mobile devices when the mobile devices were detected as being located at the generic location, wherein the specific locations include a plurality of descriptions of the generic location;
   when a particular user's mobile device has obtained a particular media object and been detected as being located at the generic location and it is determined that the particular user has not entered a specific location to annotate the particular media object, for the particular user automatically analyzing the specific locations that were obtained from users who belong to the particular user's social network so as to select a first specific location for the generic location from among the specific locations from users who belong to the particular user's network and annotating the particular media object with the first specific location; and
   when a second particular user's mobile device has obtained a second particular media object and been detected as being located at the generic location and it is determined that the second particular user and the users who belong to such second particular user's social network have not entered a specific location to annotate the second particular media object, for the second particular user automatically analyzing the specific locations that were obtained from users who do not belong to the second particular user's social network so as to select a second specific location for the generic location from among the specific locations from users who do not belong to such second particular user's social network and annotating the second particular media object with the second specific location.

2. A method as recited in claim 1, wherein the generic location is a cellular tower identity (ID).

3. A method as recited in claim 1, wherein the first specific location is further based on location data for the generic location that is obtained from an external source.

4. A method as recited in claim 3, wherein the external source is a global positioning satellite (GPS) system.

5. A method as recited in claim 3, wherein the generic location is in the form of a cellular tower ID and the external source is a cellular phone provider service that provides location data that is mapped to cellular tower ID's.

6. A method as recited in claim 1, wherein the first specific location is selected from specific locations that conflict with each other by utilizing collision control so as to select the first specific location as most likely to be accurate.

7. A method as recited in claim 1, wherein the first specific location's description is downgraded to a less specific description if one or more specific locations were entered for a neighboring generic location and have a description that conflicts with the first specific location's description.

8. A method as recited in claim 7, wherein the first specific location's description is downgraded by removing a zipcode that conflicts with a conflicting zipcode of the one or more conflicting specific locations.

9. A method as recited in claim 1, wherein the particular media object is a digital photograph.

10. A method as recited in claim 1, further comprising presenting one or more points to a user each time the user enters a specific location for the generic location so as to motivate users to enter specific locations and presenting a reward to a user when such user has reached a particular number of points.

11. A method as recited in claim 1, further comprising selecting the first specific location from other specific locations that were entered by other users for another generic location that is near the generic location if specific locations are not entered for the generic location.

12. An apparatus for mapping a specific location to a generic location of a mobile device, comprising
   at least one processor; and
   at least one memory, wherein at least one of the processor or memory is configured for:
      for a generic location, obtaining a plurality of specific locations that were entered by a plurality of users to annotate a plurality of media objects on their mobile devices when the mobile devices were detected as being located at the generic location, wherein the specific locations include a plurality of descriptions of the generic location;
      when a particular user's mobile device has obtained a particular media object and been detected as being located at the generic location and it is determined that the particular user has not entered a specific location to annotate the particular media object, for the particular user automatically analyzing the specific locations that were obtained from users who belong to the particular user's social network so as to select a first specific location for the generic location from among the specific locations from users who belong to the particular user's network and annotating the particular media object with the first specific location; and
      when a second particular user's mobile device has obtained a second particular media object and been detected as being located at the generic location and it is determined that the second particular user and the users who belong to such second particular user's social network have not entered a specific location to annotate the second particular media object, for the second particular user automatically analyzing the specific locations that were obtained from users who do not belong to the second particular user's social network so as to select a second specific location for the generic location from among the specific locations from users who do not belong to such second particular user's social network and annotating the second particular media object with the second specific location.

13. An apparatus as recited in claim 12, wherein the generic location is a cellular tower identity (ID).

14. An apparatus as recited in claim 12, wherein the first specific location is selected from specific locations that conflict with each other by utilizing collision control so as to select the first specific location as most likely to be accurate.

15. An apparatus as recited in claim 12, wherein the first specific location's description is downgraded to a less specific description if one or more specific locations were entered for a neighboring generic location and have a description that conflicts with the first specific location's description.

16. An apparatus as recited in claim 12, wherein the first and second media objects are digital photographs.

17. An apparatus as recited in claim 12, wherein at least one of the processor or memory is further configured for selecting the first specific location from other specific locations that were entered by other users for another generic location that is near the generic location if specific locations are not entered for the generic location.

18. At least one non-transitory computer readable storage medium having computer program instructions stored thereon that are arranged to perform the following operations:

for a generic location, obtaining a plurality of specific locations that were entered by a plurality of users to annotate a plurality of media objects on their mobile devices when the mobile devices were detected as being located at the generic location, wherein the specific locations include a plurality of descriptions of the generic location;

when a particular user's mobile device has obtained a particular media object and been detected as being located at the generic location and it is determined that the particular user has not entered a specific location to annotate the particular media object, for the particular user automatically analyzing the specific locations that were obtained from users who belong to the particular user's social network so as to select a first specific location for the generic location from among the specific locations from users who belong to the particular user's network and annotating the particular media object with the first specific location; and when a second particular user's mobile device has obtained a second particular media object and been detected as being located at the generic location and it is determined that the second particular user and the users who belong to such second particular user's social network have not entered a specific location to annotate the second particular media object, for the second particular user automatically analyzing the specific locations that were obtained from users who do not belong to the second particular user's social network so as to select a second specific location for the generic location from among the specific locations from users who do not belong to such second particular user's social network and annotating the second particular media object with the second specific location.

19. At least one computer readable storage medium as recited in claim 18, wherein the generic location is a cellular tower identity (ID).

20. At least one computer readable storage medium as recited in claim 18, wherein the first specific location is further based on location data for the generic location that is obtained from an external source.

21. At least one computer readable storage medium as recited in claim 20, wherein the external source is a global positioning satellite (GPS) system.

22. At least one computer readable storage medium as recited in claim 20, wherein the generic location is in the form of a cellular tower ID and the external source is a cellular phone provider service that provides location data that is mapped to cellular tower ID's.

23. At least one computer readable storage medium as recited in claim 18, wherein the first specific location is selected from specific locations that conflict with each other by utilizing collision control so as to select the first specific location as most likely to be accurate.

24. At least one computer readable storage medium as recited in claim 18, wherein the first specific location's description is downgraded to a less specific description if one or more specific locations were entered for a neighboring generic location and have a description that conflicts with the first specific location's description.

25. At least one computer readable storage medium as recited in claim 24, wherein the first specific location's description is downgraded by removing a zipcode that conflicts with a conflicting zipcode of the one or more conflicting specific locations.

26. At least one computer readable storage medium as recited in claim 18, wherein the first and second media objects are digital photographs.

27. At least one computer readable storage medium as recited in claim 18, wherein the computer program instructions stored thereon that are further arranged to select the first specific location from other specific locations that were entered by other users for another generic location that is near the generic location if specific locations are not entered for the generic location.

* * * * *